US012574407B2

(12) United States Patent
Dema et al.

(10) Patent No.: US 12,574,407 B2
(45) Date of Patent: Mar. 10, 2026

(54) GENERATING A CONTENT SIGNATURE OF A TEXTUAL COMMUNICATION USING OPTICAL CHARACTER RECOGNITION AND TEXT PROCESSING

(71) Applicant: Microsoft Technology Licensing, LLC, Redmond, WA (US)

(72) Inventors: Mesfin Adane Dema, Allen, TX (US); Jonathan Ray Armer, Covington, WA (US); Yafet Kebede Tamene, Atlanta, GA (US); Michael David Cyr, Bellevue, WA (US); Eliezer Ali Cabrera Marin, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 370 days.

(21) Appl. No.: 17/991,756

(22) Filed: Nov. 21, 2022

(65) Prior Publication Data

US 2024/0171609 A1    May 23, 2024

(51) Int. Cl.
*H04L 9/40* (2022.01)
*G06F 40/205* (2020.01)
(Continued)

(52) U.S. Cl.
CPC ........ *H04L 63/1483* (2013.01); *G06F 40/205* (2020.01); *G06F 40/284* (2020.01); *G06V 30/18* (2022.01)

(58) Field of Classification Search
CPC . H04L 63/1483; G06F 40/284; G06F 40/205; G06V 30/18
See application file for complete search history.

(56) References Cited

U.S. PATENT DOCUMENTS

2013/0262089 A1* 10/2013 Whitman ................ G06F 16/93
 704/9
2014/0259157 A1* 9/2014 Toma .................... H04L 51/212
 726/22
(Continued)

FOREIGN PATENT DOCUMENTS

WO 2016139462 A1 9/2016

OTHER PUBLICATIONS

"International Search Report and Written Opinion received in PCT Application No. PCT/US23/035567," Mailed Date: Feb. 12, 2024, 16 pages.

(Continued)

*Primary Examiner* — Philip J Chea
*Assistant Examiner* — Ghizlane Maazouz
(74) *Attorney, Agent, or Firm* — Wade IP Law PLLC

(57) ABSTRACT

Techniques are described herein that are capable of generating a content signature of a textual communication using OCR and text processing. The textual communication is rendered. Text is extracted from the rendered textual communication using OCR. Customization is removed from the text to provide a templatized version of the rendered textual communication that includes de-customized text. The de-customized text is parsed into tokens. Each token includes a respective subset of a plurality of characters. The tokens are converted into respective numbers. Each number is processed using fuzzy hash functions to provide respective hash values associated with the respective token. Representative hash values are selected for the respective fuzzy hash functions by selecting each representative hash value from the hash values that are processed using the respective fuzzy hash function. A content signature of the textual communication is generated by bitwise concatenating at least portions of the respective representative hash values.

20 Claims, 7 Drawing Sheets

(51) Int. Cl.
    *G06F 40/284*     (2020.01)
    *G06V 30/18*      (2022.01)

(56)                    References Cited

U.S. PATENT DOCUMENTS

| | | | | |
|---|---|---|---|---|
| 2017/0039211 | A1* | 2/2017 | Pottinger | G06F 16/152 |
| 2017/0140219 | A1* | 5/2017 | King | G06F 40/166 |
| 2020/0073959 | A1* | 3/2020 | Tian | G06F 16/152 |
| 2020/0210442 | A1* | 7/2020 | Bergeron | G06F 16/2255 |
| 2020/0311414 | A1* | 10/2020 | Enuka | G06F 16/353 |
| 2021/0037006 | A1* | 2/2021 | Belenko | G06F 16/955 |
| 2022/0342574 | A1* | 10/2022 | Shabi | G06F 3/0641 |
| 2023/0033919 | A1* | 2/2023 | Kurrasch | H04L 63/1483 |
| 2023/0306114 | A1* | 9/2023 | Ji | G06F 21/577 |
| 2023/0376542 | A1* | 11/2023 | Avadhani | G06F 16/325 |

OTHER PUBLICATIONS

Josang, et al., "Robust WYSIWYS: A Method for Ensuring that What You See Is What You Sign", Australasian Information Security Conference (AISC 2008), Jan. 1, 2008, pp. 53-58.

Li, et al., "b-Bit Minwise Hashing", Retrieved from the URL: https://www.microsoft.com/en-us/research/publication/b-bit-minwise-hashing/, Apr. 2010, 10 Pages.

International Preliminary Report on Patentability (Chapter I) received for PCT Application No. PCT/US23/035567, mailed on Jun. 5, 2025, 9 pages.

\* cited by examiner

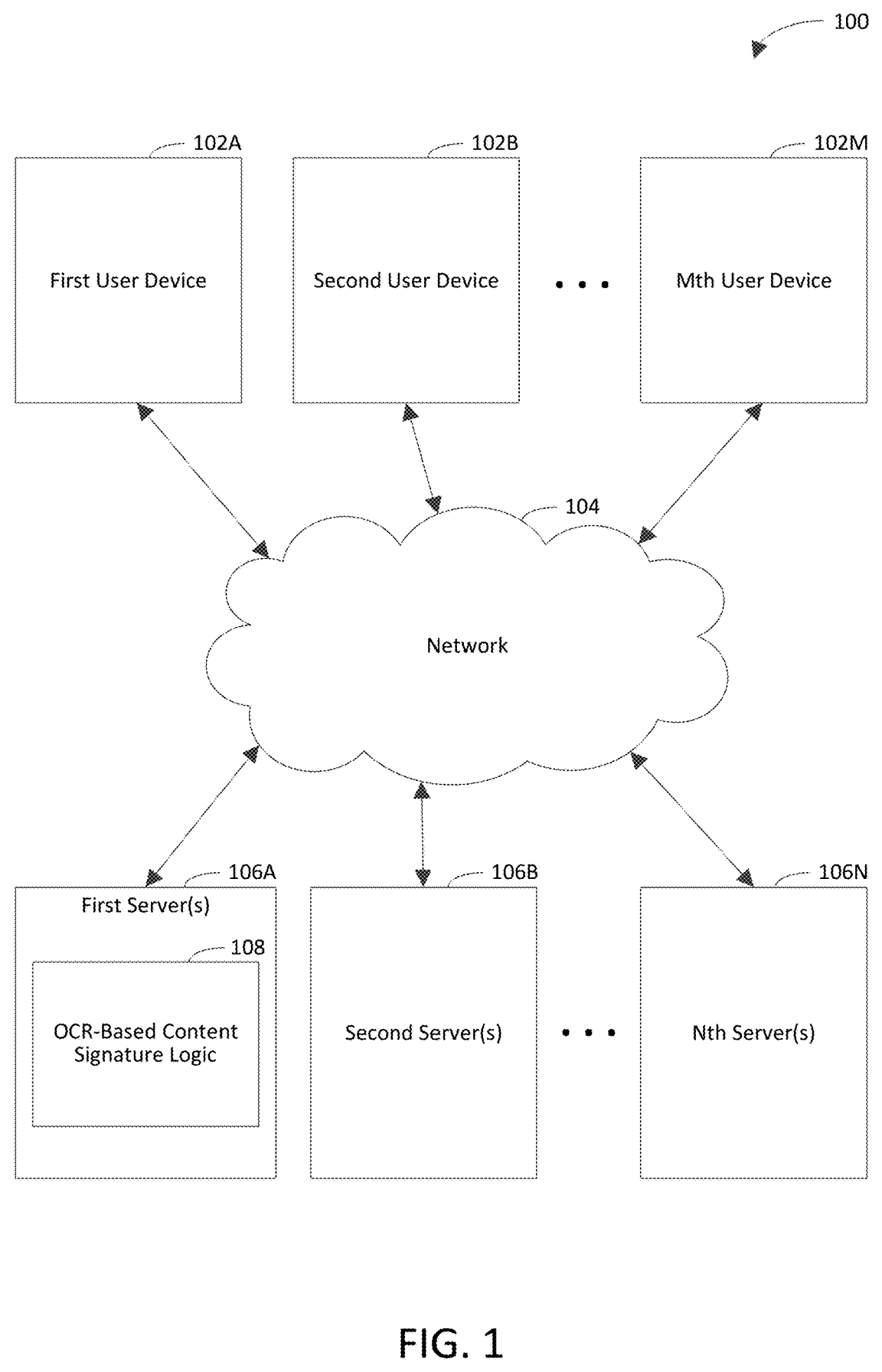

100

102A

First User Device

102B

Second User Device

• • •

102M

Mth User Device

104

Network

106A

First Server(s)

108

OCR-Based Content
Signature Logic

106B

Second Server(s)

• • •

106N

Nth Server(s)

FIG. 1

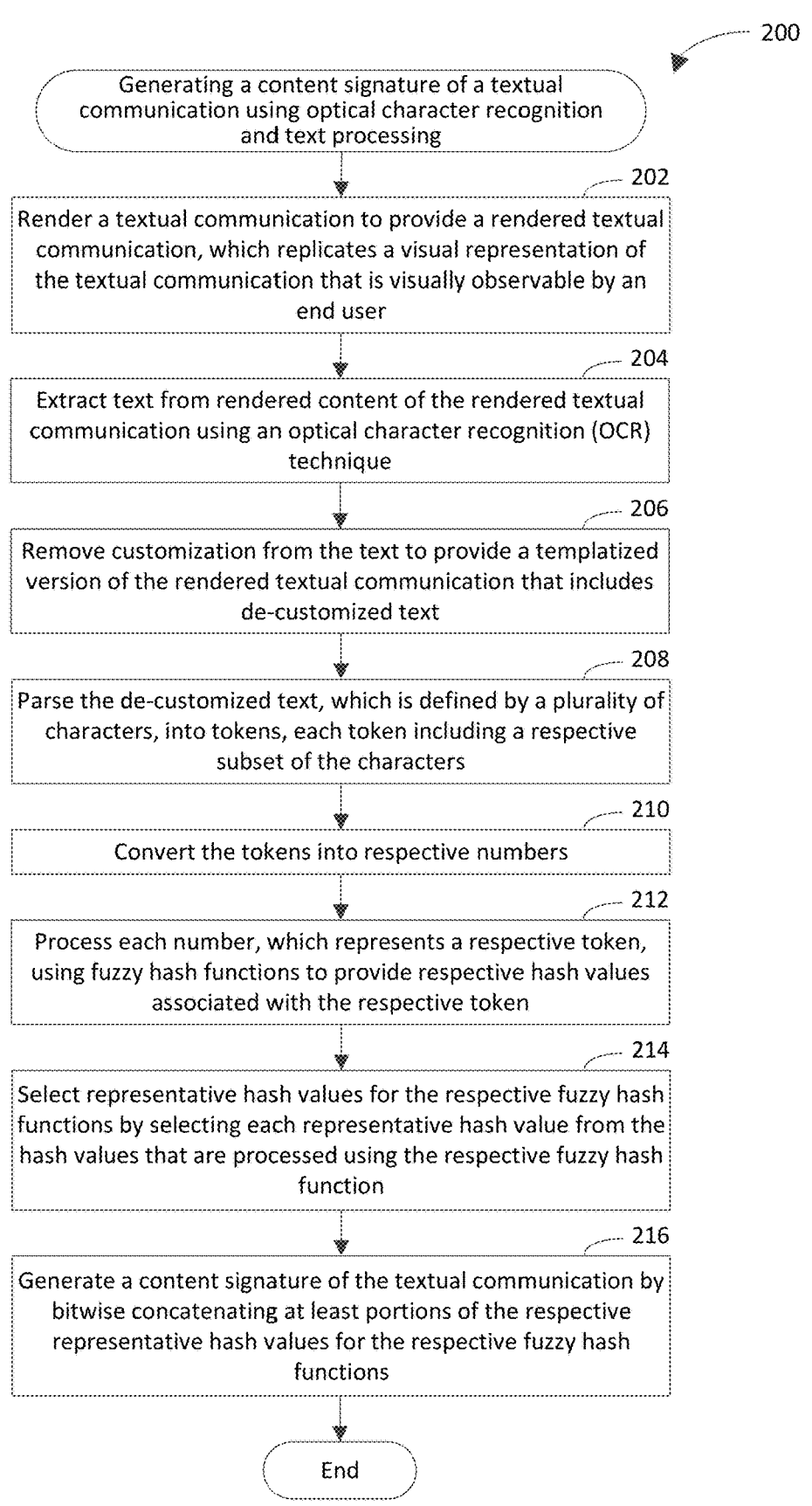

200

Generating a content signature of a textual communication using optical character recognition and text processing

202

Render a textual communication to provide a rendered textual communication, which replicates a visual representation of the textual communication that is visually observable by an end user

204

Extract text from rendered content of the rendered textual communication using an optical character recognition (OCR) technique

206

Remove customization from the text to provide a templatized version of the rendered textual communication that includes de-customized text

208

Parse the de-customized text, which is defined by a plurality of characters, into tokens, each token including a respective subset of the characters

210

Convert the tokens into respective numbers

212

Process each number, which represents a respective token, using fuzzy hash functions to provide respective hash values associated with the respective token

214

Select representative hash values for the respective fuzzy hash functions by selecting each representative hash value from the hash values that are processed using the respective fuzzy hash function

216

Generate a content signature of the textual communication by bitwise concatenating at least portions of the respective representative hash values for the respective fuzzy hash functions End

FIG. 2

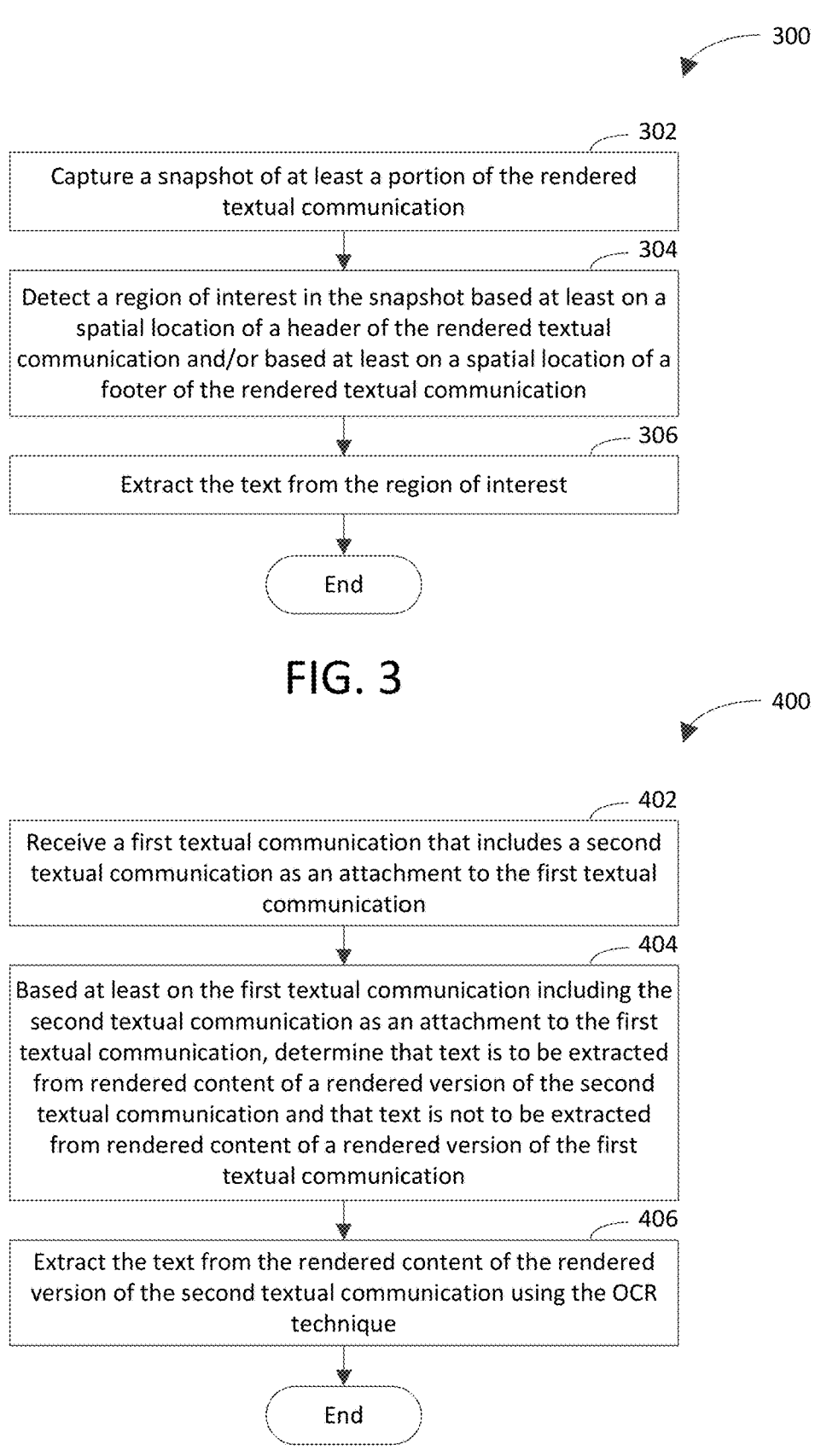

300

302

Capture a snapshot of at least a portion of the rendered textual communication

304

Detect a region of interest in the snapshot based at least on a spatial location of a header of the rendered textual communication and/or based at least on a spatial location of a footer of the rendered textual communication

306

Extract the text from the region of interest

End

Receive a first textual communication that includes a second textual communication as an attachment to the first textual communication

404

Based at least on the first textual communication including the second textual communication as an attachment to the first textual communication, determine that text is to be extracted from rendered content of a rendered version of the second textual communication and that text is not to be extracted from rendered content of a rendered version of the first textual communication

406

Extract the text from the rendered content of the rendered version of the second textual communication using the OCR technique End

FIG. 4

500

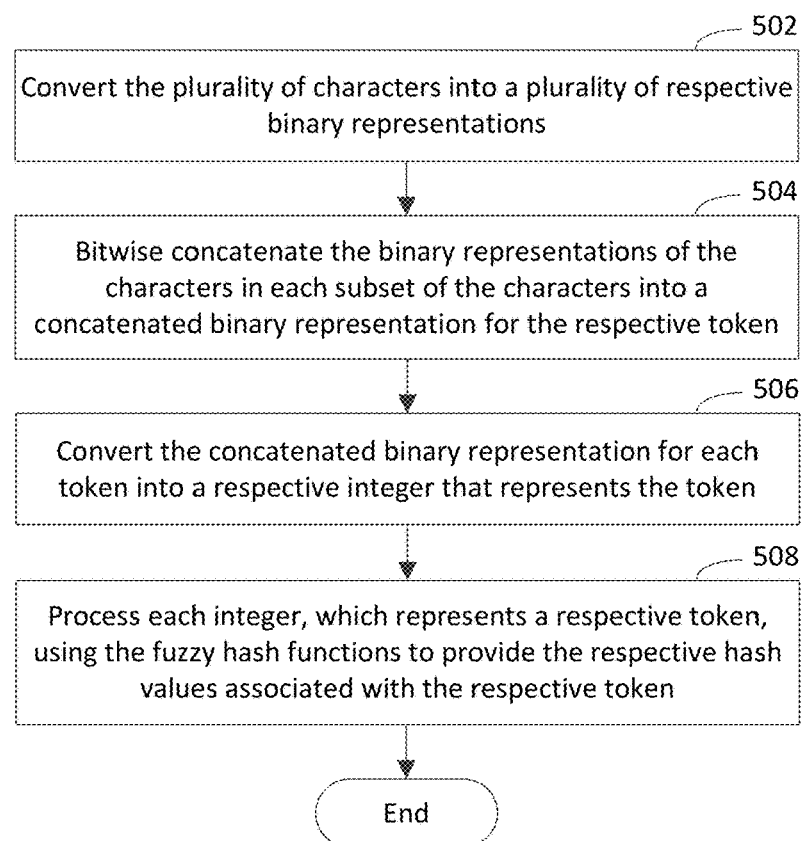

502

Convert the plurality of characters into a plurality of respective binary representations

504

Bitwise concatenate the binary representations of the characters in each subset of the characters into a concatenated binary representation for the respective token

506

Convert the concatenated binary representation for each token into a respective integer that represents the token

508

Process each integer, which represents a respective token, using the fuzzy hash functions to provide the respective hash values associated with the respective token End

FIG. 5

600

602

Determine that a similarity between the content signature of the textual communication and a reference content signature of a malicious textual communication satisfies a similarity criterion

604

Determine that the textual communication and the reference textual communication are generated from a common template based at least on the similarity between the content signature of the textual communication and the reference content signature of the malicious textual communication satisfying the similarity criterion

606

Determine a difference between the content signature of the textual communication and the reference content signature of the malicious textual communication

608

Identify a change in content of the common template based at least on the difference between the content signature of the textual communication and the reference content signature of the malicious textual communication End

FIG. 6

GENERATING A CONTENT SIGNATURE OF A TEXTUAL COMMUNICATION USING OPTICAL CHARACTER RECOGNITION AND TEXT PROCESSING

BACKGROUND

Phishing attacks have become quite common over the past several decades. A phishing attack is an attack in which a malicious entity sends a fraudulent message to a recipient in an effort to trick the recipient into revealing sensitive information (e.g., the recipient's credentials) to the malicious entity and/or to deploy malicious software (e.g., ransomware) on the recipient's infrastructure. It may be desirable to generate a content signature for each message to determine whether the content signature matches a known malicious content signature associated with a phishing attack.

Malicious entities typically customize and obfuscate their fraudulent messages using any of a variety of hypertext markup language (HTML) and styling techniques to deliver malicious content to recipients. For instance, the messages may be configured to resemble legitimate messages from a trusted entity. The malicious entities sometimes add random invisible text to the messages, for example, by using zero-size fonts, styling text with the same color as the background on which the text is presented, randomizing numbers (e.g., phone numbers or identifiers), and creating infinite domains in uniform resource locators (URLs), all of which may complicate efforts to reliably generate content signatures for the messages. Malicious entities recently have begun using image-only content and URLs that do not include text content during parsing of the HTML and that redirect to malicious pages when clicked.

Conventional content signature generation techniques parse HTML metadata of messages to identify content of the messages and to generate respective content signatures. The customization and obfuscation techniques employed by malicious entities hinder efforts to represent messages with consistent and reliable content signatures that enable clustering and blocking of threats efficiently, even when machine learning (ML) or heuristics-based detection techniques are used to generate the content signatures.

SUMMARY

It may be desirable to generate a content signature of a textual communication using a technique in addition to or in lieu of an HTML metadata parsing technique. For instance, it may be desirable to generate the content signature using optical character recognition (OCR) and text processing. By using OCR and text processing to generate the content signature, the content signature more closely represents content of an image of the textual communication that is perceived by a recipient of the textual communication, as compared to content of a representation that is based on parsing of the HTML metadata. For instance, using OCR may automatically remove obfuscation from the text, and text processing may automatically remove customization from the text. Accordingly, the challenges associated with the customization and obfuscation techniques employed by many phishing attacks may be avoided.

Various approaches are described herein for, among other things, generating a content signature of a textual communication using OCR and text processing. OCR is a process of converting (e.g., electronically converting) an image of text into characters (e.g., machine-encoded text). Text processing is a process of automating processing (e.g., manipulation) of text.

In an example approach, a textual communication is rendered to provide a rendered textual communication, which replicates a visual representation of the textual communication that is visually observable by an end user. Text is extracted from rendered content of the rendered textual communication using an optical character recognition (OCR) technique. Customization is removed from the text to provide a templatized version of the rendered textual communication that includes de-customized text. The de-customized text is parsed into tokens. The de-customized text is defined by a plurality of characters. Each token includes a respective subset of the characters. The tokens are converted into respective numbers. Each number, which represents a respective token, is processed using fuzzy hash functions to provide respective hash values associated with the respective token. Representative hash values are selected for the respective fuzzy hash functions by selecting each representative hash value from the hash values that are processed using the respective fuzzy hash function. A content signature of the textual communication is generated by bitwise concatenating at least portions of the respective representative hash values for the respective fuzzy hash functions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIG. 1 is a block diagram of an example OCR-based content signature system in accordance with an embodiment.

FIGS. 2-6 depict flowcharts of example methods for generating a content signature of a textual communication using OCR and text processing in accordance with embodiments.

Figure 7:
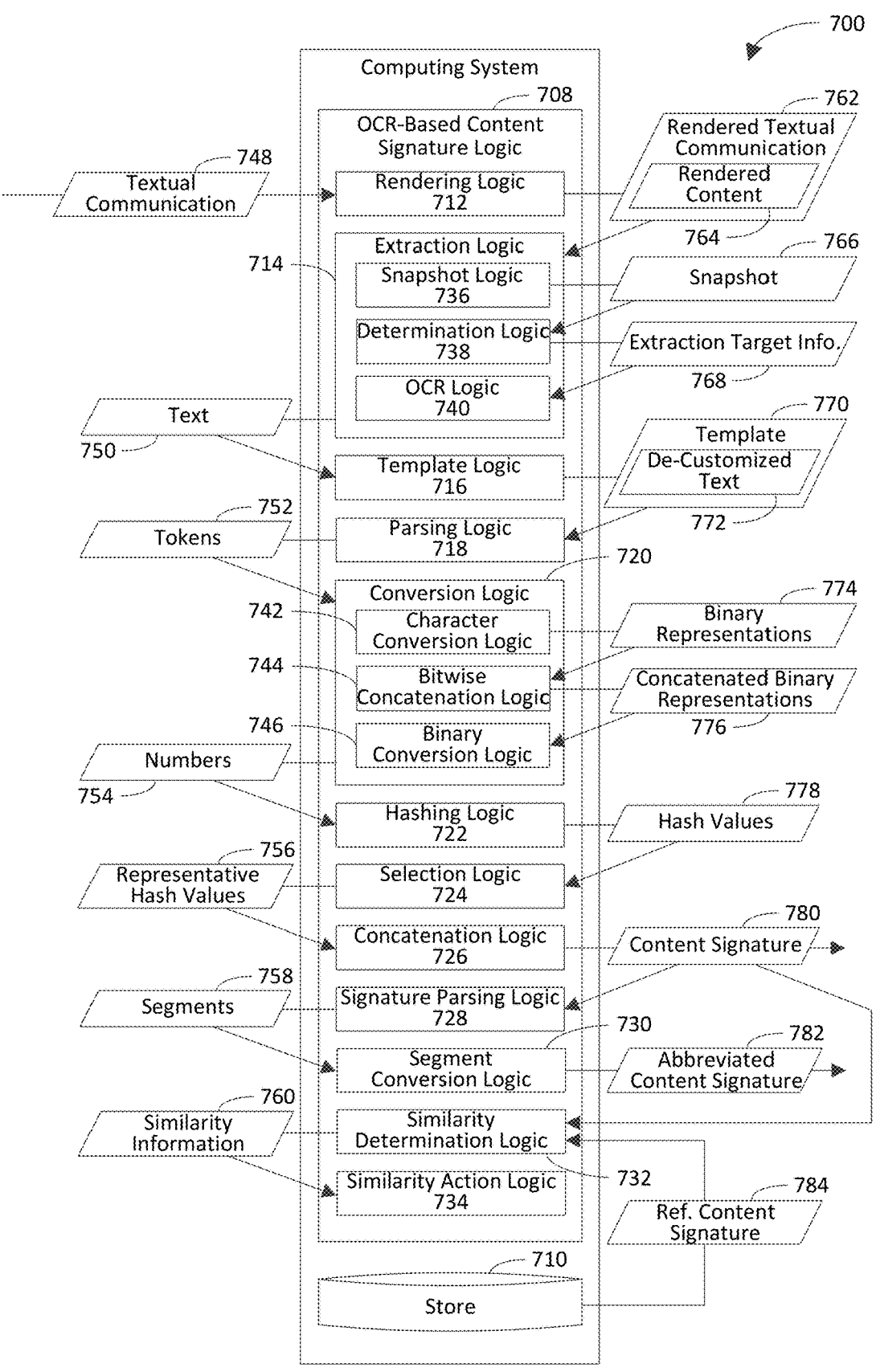
FIG. 7 is a block diagram of an example computing system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Example Embodiments

It may be desirable to generate a content signature of a textual communication using a technique in addition to or in lieu of an HTML metadata parsing technique. For instance, it may be desirable to generate the content signature using optical character recognition (OCR) and text processing. By using OCR and text processing to generate the content signature, the content signature more closely represents content of an image of the textual communication that is perceived by a recipient of the textual communication, as compared to content of a representation that is based on parsing of the HTML metadata. For instance, using OCR may automatically remove obfuscation from the text, and text processing may automatically remove customization from the text. Accordingly, the challenges associated with the customization and obfuscation techniques employed by many phishing attacks may be avoided.

Example embodiments described herein are capable of generating a content signature of a textual communication using OCR and text processing. OCR is a process of converting (e.g., electronically converting) an image of text into characters (e.g., machine-encoded text). Text processing is a process of automating processing (e.g., manipulation) of text.

Example techniques described herein have a variety of benefits as compared to conventional techniques for generating a content signature of a textual communication. For instance, the example techniques are capable of increasing security of a computing system that receives a textual communication that is associated with a phishing attack or a computing system that is accessible using a credential that is sought by the textual communication. By using OCR and text processing to generate a content signature of the textual communication, the example techniques may determine whether the textual communication is associated with a phishing attack based on the content signature. The example techniques may be capable of associating the textual communication with the phishing attack even if some aspects of the textual communication differ from other textual communications associated with the phishing attack. For instance, textual communications may be associated with the phishing attack regardless of the textual communications having content semantic variations, which may reduce a cost associated with addressing user submissions of potentially fraudulent textual communications. The example techniques may be capable of approaching content signature extraction from the end-user point of view by removing significant noise and manipulation in HTML text of the textual communication and/or by enabling the signature to be extracted from image-based content that is embedded in content of the textual communication. In an example embodiment, the OCR automatically removes obfuscation from a rendering of the textual communication. In another example embodiment, the text processing automatically removes customization from the rendering of the textual communication.

The example techniques may be capable of generating consistent and reliable content signatures that enable clustering and blocking of threats efficiently. It should be noted that by categorizing a textual communication as being associated with a phishing attack, other textual communications having respective content signatures that are similar to the content signature of the categorized textual communication may be automatically categorized as being associated with the phishing attack. The example techniques may enable threat hunting teams and security administrators to identify threats and terminate attacks shortly after the attacks are initiated.

The example techniques may increase accuracy, precision, and/or reliability of a determination as to whether a textual communication is associated with a phishing attack. The increased accuracy, precision, and/or reliability of the determination may increase a user experience of a recipient of the textual communication and/or an information technology (IT) professional (e.g., security administrator, grader, or campaign team member) who manages or contributes to security of a system, for example, based on an increased confidence in the determination. The increased accuracy, precision, and/or reliability of the determination may increase a likelihood of the IT professional to identify the textual communication as being associated with a phishing attack and/or increase a speed with which the IT professional is able to perform a remedial action with regard to the textual communication (or the phishing attack in general). It will be recognized that association of the textual communication with the phishing attack and performance of the remedial action may be performed automatically (e.g., without involvement of the IT professional).

The example techniques may reduce an amount of time and/or resources (e.g., processor cycles, memory, network bandwidth) that is consumed to determine whether a textual communication is associated with a phishing attack. For instance, by using a content signature of the textual communication that is generated using OCR and text processing, the time and/or resources that would have been consumed (e.g., by an IT professional) to manually confirm the determination may be reduced (e.g., avoided). When a failure to associate a textual communication with a phishing attack occurs, the phishing attack is said to be fragmented. Avoiding such fragmentation avoids consumption of time and/or resources that otherwise would have been consumed to resolve the phishing attack. By reducing the amount of time and/or resources that is consumed by a computing system to determine whether the textual communication is associated with a phishing attack, the efficiency of the computing system may be increased.

FIG. 1 is a block diagram of an example OCR-based content signature system 100 in accordance with an embodiment. Generally speaking, the OCR-based content signature system 100 operates to provide information to users in response to requests (e.g., hypertext transfer protocol (HTTP) requests) that are received from the users. The information may include documents (Web pages, images, audio files, video files, etc.), output of executables, and/or any other suitable type of information. In accordance with example embodiments described herein, the OCR-based content signature system 100 generates a content signature of a textual communication using OCR and text processing. Detail regarding techniques for generating a content signature of a textual communication using OCR and text processing is provided in the following discussion.

As shown in FIG. 1, the OCR-based content signature system 100 includes a plurality of user devices 102A-102M, a network 104, and a plurality of servers 106A-106N. Communication among the user devices 102A-102M and the servers 106A-106N is carried out over the network 104 using well-known network communication protocols. The network 104 may be a wide-area network (e.g., the Internet), a local area network (LAN), another type of network, or a combination thereof.

The user devices 102A-102M are computing systems that are capable of communicating with servers 106A-106N. A computing system is a system that includes a processing system comprising at least one processor that is capable of manipulating data in accordance with a set of instructions. For instance, a computing system may be a computer, a personal digital assistant, etc. The user devices 102A-102M are configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 104A-104N, so that the user devices 102A-102M may access information that is available via the domains. Such domain may include Web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 102A-102M may communicate with any one or more of the servers 106A-106N.

The servers 106A-106N are computing systems that are capable of communicating with the user devices 102A-102M. The servers 106A-106N are configured to execute computer programs that provide information to users in response to receiving requests from the users. For example, the information may include documents (Web pages, images, audio files, video files, etc.), output of executables, or any other suitable type of information. In accordance with some example embodiments, the servers 106A-106N are configured to host respective Web sites, so that the Web sites are accessible to users of the OCR-based content signature system 100.

One example type of computer program that may be executed by one or more of the servers 106A-106N is an anti-malware program. An anti-malware program is a computer program that is configured to detect, block, and/or remove malware. It will be recognized that an anti-malware program or at least a portion thereof may be executed by any one or more of the user devices 102A-102M. Examples of an anti-malware program include but are not limited to Microsoft Defender® developed and distributed by Microsoft Corporation, Norton AntiVirus® developed and distributed by Symantec Corporation, McAfee LiveSafe® developed and distributed by McAfee, Inc., and Avast Antivirus™ developed and distributed by Avast Software s.r.o. It will be recognized that the example techniques described herein may be implemented using an anti-malware program. For instance, a software product (e.g., a subscription service, a non-subscription service, or a combination thereof) may include the anti-malware program, and the software product may be configured to perform the example techniques, though the scope of the example embodiments is not limited in this respect.

The first server(s) 106A are shown to include OCR-based content signature logic 108 for illustrative purposes. The OCR-based content signature logic 108 is configured to generate a content signature of a textual communication using OCR and text processing. For example, the textual communication may be generated by a user at one of the user devices 102A-102M and directed to user(s) at one or more others of the user devices 102A-102M. In accordance with this example, the OCR-based content signature logic 108 may intercept the textual communication for purposes of generating the content signature.

In an example implementation, the OCR-based content signature logic 108 renders a textual communication to provide a rendered textual communication, which replicates a visual representation of the textual communication that is visually observable by an end user. The OCR-based content signature logic 108 extracts text from rendered content of the rendered textual communication using an optical character recognition (OCR) technique. The OCR-based content signature logic 108 removed customization from the text to provide a templatized version of the rendered textual communication that includes de-customized text. The OCR-based content signature logic 108 parses the de-customized text into tokens. The de-customized text is defined by a plurality of characters. Each token includes a respective subset of the characters. The OCR-based content signature logic 108 converts the tokens into respective numbers. The OCR-based content signature logic 108 processes each number, which represents a respective token, using fuzzy hash functions to provide respective hash values associated with the respective token. The OCR-based content signature logic 108 selects representative hash values for the respective fuzzy hash functions by selecting each representative hash value from the hash values that are processed using the respective fuzzy hash function. The OCR-based content signature logic 108 generates a content signature of the textual communication by bitwise concatenating at least portions of the respective representative hash values for the respective fuzzy hash functions.

The OCR-based content signature logic 108 may use machine learning to perform at least some of its operations. For instance, the OCR-based content signature logic 108 may use the machine learning to analyze (e.g., develop and/or refine an understanding of) text in rendered content of rendered textual communications, customizations in the text, numerical representations of tokens that are parsed from the text, hash values associated with the tokens, representative hash values associated with respective fuzzy hash functions that are used to generate the hash values, and content signatures of the textual communications, relationships between any of the foregoing elements, and confidences in those relationships. For example, the OCR-based content signature logic 108 may use the machine learning to render textual communications, extract text from rendered content of the rendered textual communications, remove customization from the text, parse the de-customized text into tokens, convert the tokens into respective numbers, process each number using fuzzy hash functions to provide hash values, and select representative hash values for the fuzzy hash functions to generate content signatures of the textual communications.

The OCR-based content signature logic 108 may be implemented in various ways to generate a content signature of a textual communication using OCR and text processing, including being implemented in hardware, software, firmware, or any combination thereof. For example, the OCR-based content signature logic 108 may be implemented as computer program code configured to be executed in one or more processors. In another example, at least a portion of the OCR-based content signature logic 108 may be implemented as hardware logic/electrical circuitry. For instance, at least a portion of the OCR-based content signature logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

It will be recognized that the OCR-based content signature logic 108 may be (or may be included in) an anti-malware program, though the scope of the example embodiments is not limited in this respect.

The OCR-based content signature logic 108 is shown to be incorporated in the first server(s) 106A for illustrative purposes and is not intended to be limiting. It will be recognized that the OCR-based content signature logic 108 (or any portion(s) thereof) may be incorporated in any one or more of the servers 106A-106N, any one or more of the user devices 102A-102M, or any combination thereof. For example, client-side aspects of the OCR-based content signature logic 108 may be incorporated in one or more of the user devices 102A-102M, and server-side aspects of OCR-based content signature logic 108 may be incorporated in one or more of the servers 106A-106N.

FIGS. 2-6 depict flowcharts 200, 300, 400, 500, and 600 of example methods for generating a content signature of a textual communication using OCR and text processing in accordance with embodiments. Flowcharts 200, 300, 400, 500, and 600 may be performed by the first server(s) 106A shown in FIG. 1, for example. For illustrative purposes, flowcharts 200, 300, 400, 500, and 600 are described with respect to computing system 700 shown in FIG. 7, which is an example implementation of the first server(s) 106A. As shown in FIG. 7, the computing system 700 includes OCR-based content signature logic 708 and a store 710. The OCR-based content signature logic 708 includes rendering logic 712, extraction logic 714, template logic 716, parsing logic 718, conversion logic 720, hashing logic 722, selection logic 724, concatenation logic 726, signature parsing logic 728, segment conversion logic 730, similarity determination logic 732, and similarity action logic 734. The extraction logic 724 includes snapshot logic 736, determination logic 738, and OCR logic 740. The conversion logic 720 includes character conversion logic 742, bitwise concatenation logic 744, and binary conversion logic 746. The store 710 may be any suitable type of store. One type of store is a database. For instance, the store 710 may be a relational database, an entity-relationship database, an object database, an object relational database, an extensible markup language (XML) database, etc. Further structural and operational embodiments will be apparent to persons skilled in the relevant art(s) based on the discussion regarding flowcharts 200, 300, 400, 500, and 600.

As shown in FIG. 2, the method of flowchart 200 begins at step 202. In step 202, a textual communication is rendered to provide a rendered textual communication, which replicates a visual representation of the textual communication that is visually observable by an end user. Examples of a textual communication include but are not limited to an email, an instant message (IM), a short message service

8

(SMS) communication, a Microsoft Teams® message, and a Slack® message. A Microsoft Teams® message is a message generated using a Microsoft Teams® program, which is developed and distributed by Microsoft Corporation. A Slack® message is a message generated using a Slack® program, which is developed and distributed by Slack Technologies, Inc. In an aspect, the rendered textual communication represents a scanned image of the textual communication. In an example implementation, the rendering logic 712 renders a textual communication 748 to provide a rendered textual communication 762, which replicates a visual representation of the textual communication 748 that is visually observable by the end user.

At step 204, text is extracted from rendered content of the rendered textual communication using an optical character recognition (OCR) technique. An OCR technique enables text (e.g., printed or handwritten text) to be extracted from an image. In an example embodiment, the rendered content is content of an image that represents the textual communication, and the text is extracted from the image. In a phishing attack example, the rendered textual communication uses a uniform resource identifier (URI), such as a uniform resource name (URN) or a uniform resource locator (URL), that does not include text content when the HTML of the textual communication is parsed and that redirects to a malicious page when clicked. In an example implementation, the extraction logic 714 extracts text 750 from rendered content 764 of the rendered textual communication 762 using an optical character recognition (OCR) technique.

In an aspect, extracting the text from the rendered content at step 204 increases security of a computing system (e.g., computing system 700) that receives the textual communication and/or a computing system that is accessible using a credential that is sought by the textual communication (e.g., by increasing accuracy, precision, and/or reliability of a determination as to whether the textual communication is associated with a phishing attack). In another aspect, extracting the text from the rendered content at step 204 reduces an amount of time and resources that is consumed (by a computing system) to determine whether the textual communication is associated with a phishing attack. By reducing the amount of time and/or resources that is consumed by the computing system, the efficiency of the computing system may be increased.

In an example embodiment, extracting the text from the rendered content at step 204 includes removing styling from the rendered content to provide the text. In an aspect, the styling includes obfuscation. Obfuscation is information (e.g., text) that is obscured (e.g., hidden), unclear, or unintelligible. For example, the obfuscation may cause the information to be invisible to an end user. Examples of obfuscation include but are not limited to a relatively small fonts (e.g., fonts of zero size), text having the same color as the background on which the text is presented, randomization of numbers (e.g., phone numbers or identifiers), infinite subdomains in uniform resource identifiers, random text and/or numbers between HTML, tags, and non-alphabetical non-space characters.

At step 206, customization is removed from the text to provide a templatized version of the rendered textual communication that includes de-customized text. Customization in text is a portion of the text that has a relatively high likelihood of being modified across textual communications that are sent to respective recipients in accordance with a phishing attack. For instance, the customization may have a likelihood of being modified across the textual communications that is greater than or equal to a likelihood threshold.

Examples of customization in text include but are not limited to personalization, a date (e.g., day/month), and a URI (e.g., a URN or a URL). Examples of personalization include but are not limited to text that identifies a sender of the textual communication (e.g., a username, an email address), text that identifies a recipient of the textual communication (e.g., a recipient name, an email address), and domain information of the recipient.

In an example embodiment, removing the customization from the text at step 206 includes replacing the customization with one or more tags. Each tag indicates a type of the customization that is replaced. Example types of a customization include but are not limited to a name, a date, a URI, an email address, and a domain.

For instance, an email address of a recipient or a sender of the textual communication may be normalized by replacing the email address with an <EMAIL> tag. One or more non-alphabetical, non-space characters may be removed, for example, to address chaffing. For example, assume that the text includes the following snippet: "Reference #: adn-dd9-7295647758576355-294". Removing the non-alphabetical, non-space characters (e.g., numbers and dashes) from the snippet results in the following de-customized snippet: "Reference: adndd". A domain of the recipient may be normalized by replacing the domain with a <DOMAIN> tag. The name (e.g., first and last names) of the recipient may be normalized by replacing the name with a <NAME> tag. An indication of the day or the month may be replaced with a <DAY> tag or a <MONTH> tag, respectively. A URL associated with the textual communication may be replaced with a <URL> tag.

In an aspect, removing the customization from the text at step 206 increases security of a computing system (e.g., computing system 700) that receives the textual communication and/or a computing system that is accessible using a credential that is sought by the textual communication (e.g., by increasing accuracy, precision, and/or reliability of a determination as to whether the textual communication is associated with a phishing attack). In another aspect, removing the customization from the text at step 206 reduces an amount of time and resources that is consumed (by a computing system) to determine whether the textual communication is associated with a phishing attack. By reducing the amount of time and/or resources that is consumed by the computing system, the efficiency of the computing system may be increased.

In an example implementation, the template logic 716 removes the customization from the text 750 to provide a template 770 that includes de-customized text 772. The template 770 is a templatized version of the rendered textual communication 762. The de-customized text 772 is a representation of the text 750 from which the customization has been removed.

At step 208, the de-customized text, which is defined by a plurality of characters, is parsed into tokens (a.k.a. shingles). Each token includes a respective subset of the characters. In an aspect, the tokens have a common (e.g., same) fixed character length. A fixed character length indicates a fixed number of characters in each of the tokens. In an example implementation, the parsing logic 718 parses the de-customized text 772, which is defined by the plurality of characters, into tokens 752. Each of the tokens 752 includes a respective subset of the characters.

In an example embodiment, parsing the de-customized text at step 208 includes applying a rolling window to the plurality of characters to define the tokens such that each successive token begins at a next successive character of the plurality of characters, at a next successive word in the plurality of characters, or at a next successive sentence in the plurality of characters.

At step 210, the tokens are converted into respective numbers. In an example implementation, the conversion logic 720 converts the tokens 752 into respective numbers 754. For instance, the conversion logic 720 may encode the tokens 752 to provide the respective numbers 754.

At step 212, each number, which represents a respective token, is processed using fuzzy hash functions to provide respective hash values associated with the respective token. A fuzzy hash function is a hash function that preserves similarity between tokens. An example fuzzy hash function is a locality sensitive hashing (LSH) function. A LSH function hashes similar input items into the same "buckets" with high probability. For instance, the LSH function may maximize hashing collisions (e.g., multiple input items resulting in respective hash values that are the same or substantially the same). In an aspect, each number is processed using a pre-determined fixed number of fuzzy hash functions. In an example implementation, the hashing logic 722 processes each of the numbers 754 that represents a respective one of the tokens 752 using the fuzzy hash functions to provide respective hash values associated with the respective token. Accordingly, each of the tokens 752 is associated with a respective set of hash values. The sets of hash values that are associated with the respective tokens 752 are collectively referred to as hash values 778.

At step 214, representative hash values are selected for the respective fuzzy hash functions by selecting each representative hash value from the hash values that are processed using the respective fuzzy hash function. In an aspect, a single representative hash value is selected for each fuzzy hash function. It will be recognized that selecting a representative hash value for each fuzzy hash function may reduce dimensionality of the content of the textual message. In an example implementation, the selection logic 724 selects representative hash values 756 for the respective fuzzy hash functions by selecting each representative hash value from the hash values that are processed using the respective fuzzy hash function. Accordingly, a first fuzzy hash function that was used to process the numbers 754 is associated with a first representative hash value; a second fuzzy hash function that was used to process the numbers 754 is associated with a second representative hash value, and so on.

In an example embodiment, selecting the representative hash values for the respective fuzzy hash functions at step 214 includes selecting each representative hash value from the hash values that are processed using the respective fuzzy hash function based at least on the respective representative hash value being no greater than (e.g., being less than) each of the other hash values that are processed using the respective fuzzy hash function.

In another example embodiment, selecting the representative hash values for the respective fuzzy hash functions at step 214 includes selecting each representative hash value from the hash values that are processed using the respective fuzzy hash function based at least on the respective representative hash value being no less than (e.g., being greater than) each of the other hash values that are processed using the respective fuzzy hash function.

At step 216, a content signature of the textual communication is generated by bitwise concatenating at least portions of the respective representative hash values for the respective fuzzy hash functions. In an example embodiment, each portion includes a pre-determined fixed number of bits (e.g., 2, 3, 4, 5, or 6 bits) from the respective representative hash value. For instance, the bits that are included in each portion may be the last N bits of the respective representative hash value, where N is the pre-determined fixed number. In an example implementation, the concatenation logic 726 generates a content signature 780 of the textual communication 748 by bitwise concatenating at least portions of the respective representative hash values 756 for the respective fuzzy hash functions.

In an aspect, generating the content signature at step 216 increases security of a computing system (e.g., computing system 700) that receives the textual communication and/or a computing system that is accessible using a credential that is sought by the textual communication (e.g., by increasing accuracy, precision, and/or reliability of a determination as to whether the textual communication is associated with a phishing attack). In another aspect, generating the content signature at step 216 reduces an amount of time and resources that is consumed (by a computing system) to determine whether the textual communication is associated with a phishing attack. By reducing the amount of time and/or resources that is consumed by the computing system, the efficiency of the computing system may be increased.

In an example embodiment, generating the content signature at step 216 is performed by bitwise concatenating the portions of the respective representative hash values for the respective fuzzy hash functions. In accordance with this embodiment, each of the portions is defined by the last N bits of the respective representative hash value, where N is a predefined number that is less than or equal to four. For instance, the predefined number may be one, two, three, or four (e.g., depending on the desired length of the content signature).

In an example implementation, assume that the text that is extracted from the rendered textual communication at step 204 includes the following: "Hello Foo, how are you? Regards, Andy". In accordance with this implementation, the de-customized text that results from removing the customization from the text at step 206 is as follows: "Hello <NAME>, how are you? Regard s, <NAME>". In further accordance with this implementation, parsing the de-customized text at step 208 includes breaking the de-customized text into 3-grams, which results in the following tokens: "Hel", "ell", "llo", "lo and so on. In further accordance with this implementation, converting the tokens into respective numbers at step 210 includes converting the first token "Hel" into a binary number "1001000 0000000001000101 0000000001001100," which is then converted to the following integer: "309242167372." In further accordance with this implementation, the integer is processed at step 212 using 96 fuzzy hash functions to provide 96 respective hash values. In further accordance with this implementation, 96 representative hash values are selected for the 96 respective fuzzy hash functions at step 214. In further accordance with this implementation, the last 4 bits of the representative hash values are bitwise concatenated at step 216, resulting in a 384-bit content signature for the textual communication. The 384-bit content signature is represented concisely in hexadecimal form, where adjacent 128-bit portions are separated by a period, such that the content signature is presented as follows: "7E726338AEAC45199D57FBAD65DD6D6E.70D32C30 467EDF323B5461C3A208 F090.8AC51C27E15211BD1447E0623C447B". It will be recognized that the values described above with regard to this implementation are provided for illustrative purposes and are not intended to be limiting.

In some example embodiments, one or more steps 202, 204, 206, 208, 210, 212, 214, and/or 216 of flowchart 200 may not be performed. Moreover, steps in addition to or in lieu of steps 202, 204, 206, 208, 210, 212, 214, and/or 216 may be performed. For instance, in an example embodiment, the method of flowchart 200 further includes parsing the content signature of the textual communication into multiple segments. In an example implementation, the signature parsing logic 728 parses the content signature 780 of the textual communication 748 into segments 758. In accordance with this embodiment, the method of flowchart 200 further includes converting the segments into respective hexadecimal numbers that represent the respective segments to provide an abbreviated content signature of the textual communication. In an example implementation, the segment conversion logic 730 converts the segments 758 into respective hexadecimal numbers that represent the respective segments 758 to provide an abbreviated content signature 782 of the textual communication 748. In an aspect of this embodiment, the method of flowchart 200 further includes inserting a symbol (e.g., a period) between adjacent segments in the abbreviated content signature. In an example implementation, for each pair of segments in the abbreviated content signature 782, the segment conversion logic 730 inserts a symbol between first and second segments in the pair.

In another example embodiment, the method of flowchart 200 further includes determining that a similarity between the content signature of the textual communication and a reference content signature of a malicious textual communication satisfies a similarity criterion. For instance, the similarity criterion may require that a difference between the content signature and the reference content signature is less than or equal to a difference threshold. In an example implementation, the similarity determination logic 732 determines that a similarity between the content signature 780 of the textual communication 748 and a reference content signature 784 of the malicious textual communication satisfies the similarity criterion. In an aspect, the store 710 stores the reference content signature 784, and the similarity determination logic 732 retrieves the reference content signature 784 from the store 784 for purposes of comparing the reference content signature 784 to the content signature 780. The similarity determination logic 732 generates similarity information 760 to indicate that the similarity satisfies the similarity criterion. In accordance with this embodiment, the method of flowchart 200 further includes blocking delivery of the textual communication to an intended recipient of the textual communication based at least on the similarity between the content signature of the textual communication and the reference content signature of the malicious textual communication satisfying the similarity criterion. In an example implementation, the similarity action logic 734 blocks delivery of the textual communication 748 to an intended recipient of the textual communication 748 based at least on the similarity between the content signature 780 of the textual communication 748 and the reference content signature 784 of the malicious textual communication satisfying the similarity criterion. For instance, the similarity action logic 734 may block the delivery of the textual communication 748 based at least on receipt of the similarity information 760 (e.g., based at least on the similarity information 760 indicating that the similarity between the content signature 780 and the reference content signature 784 satisfies the similarity criterion).

In yet another example embodiment, the method of flowchart 200 further includes determining that a similarity between the content signature of the textual communication, which is received from a first entity, and a reference content signature of a malicious textual communication, which is received from a second entity that is different from the first entity, satisfies a similarity criterion. In an example implementation, the similarity determination logic 732 determines that a similarity between the content signature 780 of the textual communication 748, which is received from the first entity, and a reference content signature 784 of the malicious textual communication, which is received from the second entity, satisfies the similarity criterion. The similarity determination logic 732 generates similarity information 760 to indicate that the similarity satisfies the similarity criterion. In accordance with this embodiment, the method of flowchart 200 further includes determining that the textual communication and the malicious textual communication are generated from a common (e.g., same) template based at least on the similarity between the content signature of the textual communication and the reference content signature of the malicious textual communication satisfying the similarity criterion. In an example implementation, the similarity action logic 734 determines that the textual communication 748 and the malicious textual communication are generated from a common template based at least on the similarity between the content signature 780 of the textual communication 748 and the reference content signature 784 of the malicious textual communication satisfying the similarity criterion. For instance, the similarity action logic 734 may determine that the textual communication 748 and the malicious textual communication are generated from the common template based at least on receipt of the similarity information 760 (e.g., based at least on the similarity information 760 indicating that the similarity between the content signature 780 and the reference content signature 784 satisfies the similarity criterion).

In still another example embodiment, the method of flowchart 200 includes one or more of the steps shown in flowchart 300 of FIG. 3. As shown in FIG. 3, the method of flowchart 300 begins at step 302. In step 302, a snapshot of at least a portion of the rendered textual communication is captured. For example, the snapshot may represent a first page of the textual communication. In accordance with this example, the first page may be an initial portion of the textual communication that is visually observable by the end user prior to the end user scrolling on the textual communication to observe subsequent portion(s) of the textual communication. In an example implementation, the snapshot logic 738 captures a snapshot 766 of at least a portion of the rendered textual communication 762.

At step 304, a region of interest in the snapshot is detected based at least on a spatial location of a header of the rendered textual communication and/or based at least on a spatial location of a footer of the rendered textual communication. For instance, the region of interest may be defined to exclude the header of the rendered textual communication and/or the footer of the rendered textual communication. In an example implementation, the determination logic 738 detects a region of interest in the snapshot 766 based at least on a spatial location of a header of the rendered textual communication 762 and/or based at least on a spatial location of a footer of the rendered textual communication 762. The determination logic 738 generates extraction target information 768, which indicates (e.g., defines or describes) the region of interest.

At step 306, the text is extracted from the region of interest. In an example implementation, the OCR logic 740 extracts the text 750 from the region of interest. Step 306 may be incorporated into step 204 shown in FIG. 2, though the example embodiments are not limited in this respect.

In an example embodiment, capturing the snapshot at step 302 includes capturing the snapshot of an entirety of the rendered textual communication. In accordance with this embodiment, the method of flowchart 300 further includes cropping the snapshot using computer vision. For instance, the determination logic 738 may crop the snapshot 766 using the computer vision. In further accordance with this embodiment, cropping the snapshot includes removing a portion of the snapshot that is not included in the region of interest. In further accordance with this embodiment, the removed portion includes the header of the textual communication.

In another example embodiment, the method of flowchart 200 includes one or more of the steps shown in flowchart 400 of FIG. 4. As shown in FIG. 4, the method of flowchart 400 begins at step 402. In step 402, a first textual communication that includes a second textual communication as an attachment to the first textual communication is received. In an example implementation, the rendering logic 712 receives the first textual communication, which includes the second textual communication. The rendering logic 712 renders the first textual communication and the second textual communication.

At step 404, based at least on the first textual communication including the second textual communication as an attachment to the first textual communication, a determination is made that text is to be extracted from rendered content of a rendered version of the second textual communication and that text is not to be extracted from rendered content of a rendered version of the first textual communication. In an example implementation, the determination logic 738 determines that text is to be extracted from rendered content of the rendered second textual communication and that text is not to be extracted from rendered content of the rendered first textual communication. The determination logic 738 configures the extraction target information 768 to indicate that text is to be extracted from the rendered content of the rendered second textual communication and that text is not to be extracted from the rendered content of the rendered first textual communication.

At step 406, the text is extracted from the rendered content of the rendered version of the second textual communication using the OCR technique. In an example implementation, the OCR logic 740 extracts the text from the rendered content of the rendered second textual communication using the OCR technique. For instance, the OCR logic 740 may extract the text from the rendered content of the rendered second textual communication based at least on receipt of the extraction target information 768 (e.g., based at least on the extraction target information 768 indicating that text is to be extracted from the rendered content of the rendered second textual communication and that text is not to be extracted from the rendered content of the rendered first textual communication). Step 406 may be incorporated into step 204 shown in FIG. 2, though the example embodiments are not limited in this respect.

In yet another example embodiment, the method of flowchart 200 includes one or more of the steps shown in flowchart 500 of FIG. 5. As shown in FIG. 5, the method of flowchart 500 begins at step 502. In step 502, the plurality of characters are converted into respective binary representations. In an example implementation, the character conversion logic 742 converts the plurality of characters into respective binary representations 774.

At step 504, the binary representations of the characters in each subset of the characters are bitwise concatenated into a concatenated binary representation for the respective token. In an example implementation, the bitwise concatenation logic 744 bitwise concatenates the binary representations of the characters in each subset of the characters into a concatenated binary representation for the respective token. The bitwise concatenation logic 744 provides concatenated binary representations 776 for the respective tokens 752 to the binary conversion logic 746 for analysis.

At step 506, the concatenated binary representation for each token is converted into a respective integer that represents the token. In an example implementation, the binary conversion logic 746 converts the concatenated binary representations 776 for the respective tokens 752 into respective integers that represent the respective tokens 752. For instance, the numbers 754 may include the respective integers.

At step 508, each integer, which represents a respective token, is processed using the fuzzy hash functions to provide the respective hash values associated with the respective token. In an example implementation, the hashing logic 722 processes each integer using the fuzzy hash functions to provide the respective hash values associated with the respective token.

Steps 502, 504, and 506 may be incorporated into step 210 shown in FIG. 2, though the example embodiments are not limited in this respect. Step 508 may be incorporated into step 212 shown in FIG. 2, though the example embodiments are not limited in this respect.

In still another example embodiment, the method of flowchart 200 further includes one or more of the steps shown in flowchart 600 of FIG. 6. As shown in FIG. 6, the method of flowchart 600 begins at step 602. In step 602, a determination is made that a similarity between the content signature of the textual communication and a reference content signature of a malicious textual communication satisfies a similarity criterion. For instance, the similarity criterion may require that a difference between the content signature of the textual communication and the reference content signature of the malicious textual communication is less than or equal to a difference threshold. In an example implementation, the similarity determination logic 732 determines that a similarity between the content signature 780 of the textual communication 748 and a reference content signature 784 of the malicious textual communication satisfies the similarity criterion. The similarity determination logic 732 configures the similarity information 760 to indicate that the similarity between the content signature 780 of the textual communication 748 and the reference content signature 784 of the malicious textual communication satisfies the similarity criterion.

At step 604, a determination is made that the textual communication and the malicious textual communication are generated from a common template based at least on the similarity between the content signature of the textual communication and the reference content signature of the malicious textual communication satisfying the similarity criterion. In an example implementation, the similarity action logic 734 determines that the textual communication 748 and the malicious textual communication are generated from a common template based at least on the similarity between the content signature 780 of the textual communication 748 and the reference content signature 784 of the malicious textual communication satisfying the similarity criterion. For instance, the similarity action logic 734 may make the determination based at least on the similarity information

760 indicating that the similarity between the content signature 780 of the textual communication 748 and the reference content signature 784 of the malicious textual communication satisfies the similarity criterion.

At step 606, a difference between the content signature of the textual communication and the reference content signature of the malicious textual communication is determined. In an example implementation, the similarity determination logic 732 determines a difference between the content signature 780 of the textual communication 748 and the reference content signature 784 of the malicious textual communication. The similarity determination logic 732 configures the similarity information 760 to indicate the difference between the content signature 780 of the textual communication 748 and the reference content signature 784 of the malicious textual communication.

At step 608, a change in content of the common template is identified based at least on the difference between the content signature of the textual communication and the reference content signature of the malicious textual communication. For example, content signatures of other textual communications, which have contents that differ from the content of the malicious textual communication in known ways, may be compared to the content signature of the textual communication. In accordance with this example, a determination is made that a difference between the content signature of an identified other textual communication, which is included among the other textual communications, and the content signature of the textual communication is less than or equal to a difference threshold. In further accordance with this example, the change in the content of the common template may be determined based at least on a difference between the content of the identified other textual communication and the content of the malicious textual communication. In an example implementation, the similarity action logic 734 identifies the change in the content of the common template based at least on the difference between the content signature 780 of the textual communication 748 and the reference content signature 784 of the malicious textual communication. For instance, the similarity action logic 734 may analyze the similarity information 760 to determine the difference between the content signature 780 and the reference content signature 784.

It will be recognized that the computing system 700 may not include one or more of the OCR-based content signature logic 708, the store 710, the rendering logic 712, the extraction logic 714, the template logic 716, the parsing logic 718, the conversion logic 720, the hashing logic 722, the selection logic 724, the concatenation logic 726, the signature parsing logic 728, the segment conversion logic 730, the similarity determination logic 732, the similarity action logic 734, the snapshot logic 736, the determination logic 738, the OCR logic 740, the character conversion logic 742, the bitwise concatenation logic 744, and/or the binary conversion logic 746. Furthermore, the computing system 700 may include components in addition to or in lieu of the OCR-based content signature logic 708, the store 710, the rendering logic 712, the extraction logic 714, the template logic 716, the parsing logic 718, the conversion logic 720, the hashing logic 722, the selection logic 724, the concatenation logic 726, the signature parsing logic 728, the segment conversion logic 730, the similarity determination logic 732, the similarity action logic 734, the snapshot logic 736, the determination logic 738, the OCR logic 740, the character conversion logic 742, the bitwise concatenation logic 744, and/or the binary conversion logic 746.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the OCR-based content signature logic 708, the store 710, the rendering logic 712, the extraction logic 714, the template logic 716, the parsing logic 718, the conversion logic 720, the hashing logic 722, the selection logic 724, the concatenation logic 726, the signature parsing logic 728, the segment conversion logic 730, the similarity determination logic 732, the similarity action logic 734, the snapshot logic 736, the determination logic 738, the OCR logic 740, the character conversion logic 742, the bitwise concatenation logic 744, the binary conversion logic 746, flowchart 200, flowchart 300, flowchart 400, flowchart 500, and/or flowchart 600 may be implemented in hardware, software, firmware, or any combination thereof.

For example, any one or more of the OCR-based content signature logic 708, the store 710, the rendering logic 712, the extraction logic 714, the template logic 716, the parsing logic 718, the conversion logic 720, the hashing logic 722, the selection logic 724, the concatenation logic 726, the signature parsing logic 728, the segment conversion logic 730, the similarity determination logic 732, the similarity action logic 734, the snapshot logic 736, the determination logic 738, the OCR logic 740, the character conversion logic 742, the bitwise concatenation logic 744, the binary conversion logic 746, flowchart 200, flowchart 300, flowchart 400, flowchart 500, and/or flowchart 600 may be implemented, at least in part, as computer program code configured to be executed in one or more processors.

In another example, any one or more of the OCR-based content signature logic 708, the store 710, the rendering logic 712, the extraction logic 714, the template logic 716, the parsing logic 718, the conversion logic 720, the hashing logic 722, the selection logic 724, the concatenation logic 726, the signature parsing logic 728, the segment conversion logic 730, the similarity determination logic 732, the similarity action logic 734, the snapshot logic 736, the determination logic 738, the OCR logic 740, the character conversion logic 742, the bitwise concatenation logic 744, the binary conversion logic 746, flowchart 200, flowchart 300, flowchart 400, flowchart 500, and/or flowchart 600 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 8:
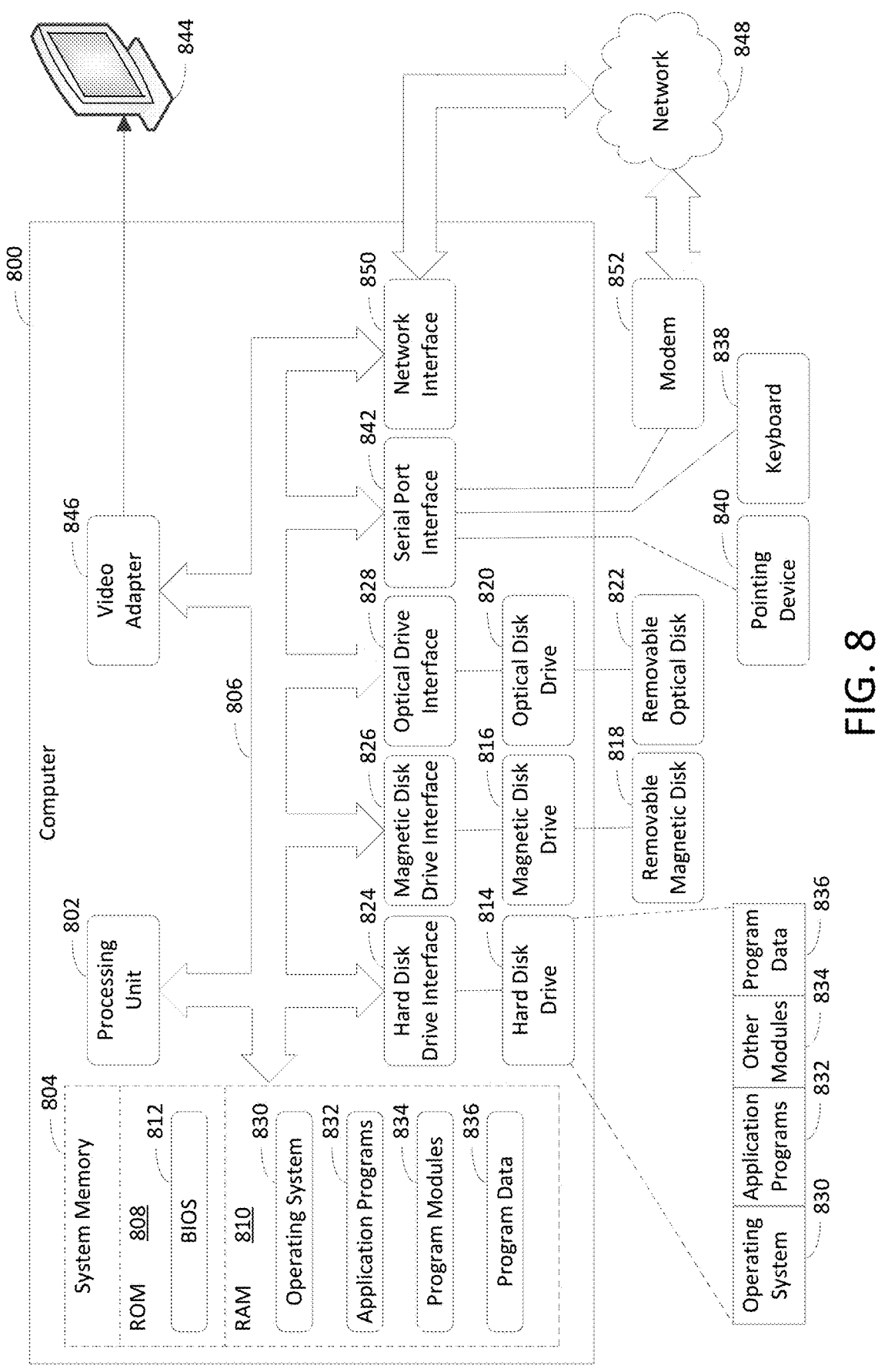
FIG. 8 depicts an example computer in which embodiments may be implemented.

II. Further Discussion of Some Example Embodiments (A1) An example system (FIG. 1, 102A-102M, 106A-106N; FIG. 7, 700; FIG. 8, 800) comprises memory (FIG. 8, 804, 808, 810) and a processing system (FIG. 8, 802) coupled to the memory. The processing system is configured to render (FIG. 2, 202) a textual communication (FIG. 7, 748) to provide a rendered textual communication (FIG. 7, 762), which replicates a visual representation of the textual communication that is visually observable by an end user. The processing system is further configured to extract (FIG. 2, 204) text (FIG. 7, 750) from rendered content (FIG. 7, 764) of the rendered textual communication using an optical character recognition technique. The processing system is further configured to remove (FIG. 2, 206) customization from the text to provide a templatized version (FIG. 7, 770) of the rendered textual communication that comprises de-customized text (FIG. 7, 772). The processing system is further configured to parse (FIG. 2, 208) the de-customized text, which is defined by a plurality of characters, into a plurality of tokens (FIG. 7, 752) that comprise respective subsets of the plurality of characters. The processing system is further configured to convert (FIG. 2, 210) the plurality of tokens into respective numbers (FIG. 7, 754). The processing system is further configured to process (FIG. 2, 212) the numbers, which represents respective tokens of the plurality of tokens, using a plurality of fuzzy hash functions to provide respective sets of hash values associated with the respective token. The processing system is further configured to select (FIG. 2, 214) representative hash values (FIG. 7, 756) for respective fuzzy hash functions of the plurality of fuzzy hash functions by selecting a representative hash value from hash values that are processed using the respective fuzzy hash function. The processing system is further configured to generate (FIG. 2, 216) a content signature (FIG. 7, 780) of the textual communication by bitwise concatenating at least portions of the plurality of respective representative hash values for the respective fuzzy hash functions.

(A2) In the example system of A1, wherein the processing system is configured to: capture a snapshot of at least a portion of the rendered textual communication; detect a region of interest in the snapshot based at least on a spatial location of a header of the rendered textual communication; and extract the text from the region of interest.

(A3) In the example system of any of A1-A2, wherein the processing system is configured to: remove styling from the rendered content of the rendered textual communication to provide the text.

(A4) In the example system of any of A1-A3, wherein the processing system is configured to: receive a first textual communication that comprises a second textual communication as an attachment to the first textual communication; based at least on the first textual communication including the second textual communication as an attachment to the first textual communication, determine that text is to be extracted from rendered content of a rendered version of the second textual communication and that text is not to be extracted from rendered content of a rendered version of the first textual communication; and extract the text from the rendered content of the rendered version of the second textual communication using the optical character recognition technique.

(A5) In the example system of any of A1-A4, wherein the processing system is configured to: parse the de-customized text by applying a rolling window to the plurality of characters to define the plurality of tokens such that successive tokens of the plurality of tokens begin at next successive characters of the plurality of characters.

(A6) In the example system of any of A1-A5, wherein the processing system is configured to convert the plurality of tokens into the respective numbers by performing the following operations: convert the plurality of characters into a plurality of respective binary representations; generate concatenated binary representations for the respective tokens by bitwise concatenating the binary representations of characters in a respective subset of the plurality of characters into a concatenated binary representation for the respective token; and convert the concatenated binary representations for respective tokens of the plurality of tokens into respective integers that represent the respective tokens; and wherein the processing system is configured to process the numbers by performing the following operation: process the respective integers, which represent respective tokens of the plurality of tokens, using the plurality of fuzzy hash functions to provide respective sets of hash values associated with the respective tokens.

(A7) In the example system of any of A1-A6, wherein the processing system is configured to: select a representative hash value from the hash values that are processed using a respective fuzzy hash function based at least on the representative hash value being no greater than other hash values that are processed using the respective fuzzy hash function.

(A8) In the example system of any of A1-A7, wherein the processing system is configured to: select a representative hash value from the hash values that are processed using a respective fuzzy hash function based at least on the representative hash value being no less than other hash values that are processed using the respective fuzzy hash function.

(A9) In the example system of any of A1-A8, wherein the processing system is configured to: generate the content signature of the textual communication by bitwise concatenating the portions of the plurality of respective representative hash values for the respective fuzzy hash functions; wherein the portions are defined by the last N bits of the plurality of respective representative hash value; and wherein N is a predefined number that is less than or equal to four.

(A10) In the example system of any of A1-A9, wherein the processing system is further configured to: parse the content signature of the textual communication into a plurality of segments; and convert the plurality of segments into a plurality of respective hexadecimal numbers that represent the plurality of respective segments to provide an abbreviated content signature of the textual communication.

(A11) In the example system of any of A1-A10, wherein the processing system is further configured to: determine that a similarity between the content signature of the textual communication and a reference content signature of a malicious textual communication satisfies a similarity criterion; and block delivery of the textual communication to an intended recipient of the textual communication based at least on the similarity between the content signature of the textual communication and the reference content signature of the malicious textual communication satisfying the similarity criterion.

(A12) In the example system of any of A1-A11, wherein the processing system is further configured to: determine that a similarity between the content signature of the textual communication, which is received from a first entity, and a reference content signature of a malicious textual communication, which is received from a second entity that is different from the first entity, satisfies a similarity criterion; and determine that the textual communication and the malicious textual communication are generated from a common template based at least on the similarity between the content signature of the textual communication and the reference content signature of the malicious textual communication satisfying the similarity criterion.

(A13) In the example system of any of A1-A12, wherein the processing system is further configured to: determine that a similarity between the content signature of the textual communication and a reference content signature of a malicious textual communication satisfies a similarity criterion; determine that the textual communication and the malicious textual communication are generated from a common template based at least on the similarity between the content signature of the textual communication and the reference content signature of the malicious textual communication satisfying the similarity criterion; determine a difference between the content signature of the textual communication and the reference content signature of the malicious textual communication; and identify a change in content of the common template based at least on the difference between the content signature of the textual communication and the reference content signature of the malicious textual communication.

(B1) An example method is implemented by a computing system (FIG. 1, 102A-102M, 106A-106N; FIG. 7, 700; FIG. 8, 800). The method comprises rendering (FIG. 2, 202) a textual communication (FIG. 7, 748) to provide a rendered textual communication (FIG. 7, 762), which replicates a visual representation of the textual communication that is visually observable by an end user. The method further comprises extracting (FIG. 2, 204) text (FIG. 7, 750) from rendered content (FIG. 7, 764) of the rendered textual communication using an optical character recognition technique. The method further comprises removing (FIG. 2, 206) customization from the text to provide a templatized version (FIG. 7, 770) of the rendered textual communication that comprises de-customized text (FIG. 7, 772). The method further comprises parsing (FIG. 2, 208) the de-customized text, which is defined by a plurality of characters, into a plurality of tokens (FIG. 7, 752) that comprise respective subsets of the plurality of characters. The method further comprises converting (FIG. 2, 210) the plurality of tokens into respective numbers (FIG. 7, 754). The method further comprises processing (FIG. 2, 212) the numbers, which represent respective tokens of the plurality of tokens, using a plurality of fuzzy hash functions to provide respective sets of hash values associated with the respective token. The method further comprises selecting (FIG. 2, 214) representative hash values (FIG. 7, 756) for respective fuzzy hash functions of the plurality of fuzzy hash functions by selecting a representative hash value from hash values that are processed using the respective fuzzy hash function. The method further comprises generating (FIG. 2, 216) a content signature (FIG. 7, 780) of the textual communication by bitwise concatenating at least portions of the plurality of respective representative hash values for the respective fuzzy hash functions.

(B2) In the method of B1, further comprising: capturing a snapshot of at least a portion of the rendered textual communication; and detecting a region of interest in the snapshot based at least on a spatial location of a header of the rendered textual communication; wherein extracting the text comprises: extracting the text from the region of interest.

(B3) In the method of any of B1-B2, wherein extracting the text from the rendered content of the rendered textual communication comprises: removing styling from the rendered content to provide the text.

(B4) In the method of any of B1-B3, further comprising: receiving a first textual communication that comprises a second textual communication as an attachment to the first textual communication; and based at least on the first textual communication including the second textual communication as an attachment to the first textual communication, determining that text is to be extracted from rendered content of a rendered version of the second textual communication and that text is not to be extracted from rendered content of a rendered version of the first textual communication; wherein extracting the text comprises: extracting the text from the rendered content of the rendered version of the second textual communication using the optical character recognition technique.

(B5) In the method of any of B1-B4, wherein parsing the de-customized text comprises: applying a rolling window to the plurality of characters to define the plurality of tokens such that successive tokens of the plurality of tokens begin at next successive characters of the plurality of characters.

(B6) In the method of any of B1-B5, wherein converting the plurality of tokens into the respective numbers comprises: converting the plurality of characters into a plurality of respective binary representations; generating concatenated binary representations for the respective tokens by bitwise concatenating the binary representations of characters in a respective subset of the plurality of characters into a concatenated binary representation for the respective token; and converting the concatenated binary representations for respective tokens of the plurality of tokens into respective integers that represent the respective tokens; and wherein processing the numbers comprises: processing the respective integers, which represent respective tokens of the plurality of tokens, using the plurality of fuzzy hash functions to provide the respective sets of hash values associated with the respective tokens.

(B7) In the method of any of B1-B6, wherein selecting the representative hash values for the respective fuzzy hash functions comprises: selecting a representative hash value from the hash values that are processed using a respective fuzzy hash function based at least on the representative hash value being no greater than other hash values that are processed using the respective fuzzy hash function.

(B8) In the method of any of B1-B7, wherein selecting the representative hash values for the respective fuzzy hash functions comprises: selecting a representative hash value from the hash values that are processed using a respective fuzzy hash function based at least on the representative hash value being no less than other hash values that are processed using the respective fuzzy hash function.

(B9) In the method of any of B1-B8, wherein generating the content signature comprises: generating the content signature of the textual communication by bitwise concatenating the portions of the plurality of respective representative hash values for the respective fuzzy hash functions; and wherein the portions are defined by the last N bits of the plurality of respective representative hash values; and wherein N is a predefined number that is less than or equal to four.

(B10) In the method of any of B1-B9, further comprising: parsing the content signature of the textual communication into a plurality of segments; and converting the plurality of segments into a plurality of respective hexadecimal numbers that represent the plurality of respective segments to provide an abbreviated content signature of the textual communication.

(B11) In the method of any of B1-B10, further comprising: determining that a similarity between the content signature of the textual communication and a reference content signature of a malicious textual communication satisfies a similarity criterion; and blocking delivery of the textual communication to an intended recipient of the textual communication based at least on the similarity between the content signature of the textual communication and the reference content signature of the malicious textual communication satisfying the similarity criterion.

(B12) In the method of any of B1-B11, further comprising: determining that a similarity between the content signature of the textual communication, which is received from a first entity, and a reference content signature of a malicious textual communication, which is received from a second entity that is different from the first entity, satisfies a similarity criterion; and determining that the textual communication and the malicious textual communication are generated from a common template based at least on the similarity between the content signature of the textual communication and the reference content signature of the malicious textual communication satisfying the similarity criterion.

(B13) In the method of any of B1-B12, further comprising: determining that a similarity between the content signature of the textual communication and a reference content signature of a malicious textual communication satisfies a similarity criterion; determining that the textual communication and the malicious textual communication are generated from a common template based at least on the similarity between the content signature of the textual communication and the reference content signature of the malicious textual communication satisfying the similarity criterion; determining a difference between the content signature of the textual communication and the reference content signature of the malicious textual communication; and identifying a change in content of the common template based at least on the difference between the content signature of the textual communication and the reference content signature of the malicious textual communication.

(C1) An example computer program product (FIG. 8, 818, 822) comprising a computer-readable storage medium having instructions recorded thereon for enabling a processor-based system (FIG. 1, 102A-102M, 106A-106N; FIG. 7, 700; FIG. 8, 800) to perform operations. The operations comprise rendering (FIG. 2, 202) a textual communication (FIG. 7, 748) to provide a rendered textual communication (FIG. 7, 762), which replicates a visual representation of the textual communication that is visually observable by an end user. The operations further comprise extracting (FIG. 2, 204) text (FIG. 7, 750) from rendered content (FIG. 7, 764) of the rendered textual communication using an optical character recognition technique. The operations further comprise removing (FIG. 2, 206) customization from the text to provide a templatized version (FIG. 7, 770) of the rendered textual communication that comprises de-customized text (FIG. 7, 772). The operations further comprise parsing (FIG. 2, 208) the de-customized text, which is defined by a plurality of characters, into a plurality of tokens (FIG. 7, 752) that comprise respective subsets of the plurality of characters. The operations further comprise converting (FIG. 2, 210) the plurality of tokens into respective numbers (FIG. 7, 754). The operations further comprise processing (FIG. 2, 212) the numbers, which represent respective token of the plurality of tokens, using a plurality of fuzzy hash functions to provide respective sets of hash values associated with the respective tokens. The operations further comprise selecting (FIG. 2, 214) representative hash values (FIG. 7, 756) for respective fuzzy hash functions of the plurality of fuzzy hash functions by selecting a representative hash value from hash values that are processed using the respective fuzzy hash function. The operations further comprise generating (FIG. 2, 216) a content signature (FIG. 7, 780) of the textual communication by bitwise concatenating at least portions of the plurality of respective representative hash values for the respective fuzzy hash functions.

III. Example Computer System

FIG. 8 depicts an example computer 800 in which embodiments may be implemented. Any one or more of the user devices 102A-102M and/or any one or more of the servers 106A-106N shown in FIG. 1 and/or the computing system 700 shown in FIG. 7 may be implemented using computer 800, including one or more features of computer 800 and/or alternative features. Computer 800 may be a general-purpose computing device in the form of a conventional personal computer, a mobile computer, or a workstation, for example, or computer 800 may be a special purpose computing device. The description of computer 800 provided herein is provided for purposes of illustration, and is not intended to be limiting. Embodiments may be implemented in further types of computer systems, as would be known to persons skilled in the relevant art(s).

As shown in FIG. 8, computer 800 includes a processing unit 802, a system memory 804, and a bus 806 that couples various system components including system memory 804 to processing unit 802. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computer 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 830, one or more application programs 832, other program modules 834, and program data 836. Application programs 832 or program modules 834 may include, for example, computer program logic for implementing any one or more of (e.g., at least a portion of) the OCR-based content signature logic 708, the store 710, the rendering logic 712, the extraction logic 714, the template logic 716, the parsing logic 718, the conversion logic 720, the hashing logic 722, the selection logic 724, the concatenation logic 726, the signature parsing logic 728, the segment conversion logic 730, the similarity determination logic 732, the similarity action logic 734, the snapshot logic 736, the determination logic 738, the OCR logic 740, the character conversion logic 742, the bitwise concatenation logic 744, the binary conversion logic 746, flowchart 200 (including any step of flowchart 200), flowchart 300 (including any step of flowchart 300), flowchart 400 (including any step of flowchart 400), flowchart 500 (including any step of flowchart 500), and/or flowchart 600 (including any step of flowchart 600), as described herein.

A user may enter commands and information into the computer 800 through input devices such as keyboard 838 and pointing device 840. Other input devices (not shown) may include a microphone, joystick, game pad, satellite dish, scanner, touch screen, camera, accelerometer, gyroscope, or the like. These and other input devices are often connected to the processing unit 802 through a serial port interface 842 that is coupled to bus 806, but may be connected by other interfaces, such as a parallel port, game port, or a universal serial bus (USB).

A display device 844 (e.g., a monitor) is also connected to bus 806 via an interface, such as a video adapter 846. In addition to display device 844, computer 800 may include other peripheral output devices (not shown) such as speakers and printers.

Computer 800 is connected to a network 848 (e.g., the Internet) through a network interface or adapter 850, a modem 852, or other means for establishing communications over the network. Modem 852, which may be internal or external, is connected to bus 806 via serial port interface 842.

As used herein, the terms "computer program medium" and "computer-readable storage medium" are used to generally refer to media (e.g., non-transitory media) such as the hard disk associated with hard disk drive 814, removable magnetic disk 818, removable optical disk 822, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 832 and other program modules 834) may be stored on the hard disk, magnetic disk, optical disk, ROM, or RAM. Such computer programs may also be received via network interface 850 or serial port interface 842. Such computer programs, when executed or loaded by an application, enable computer 800 to implement features of embodiments discussed herein. Accordingly, such computer programs represent controllers of the computer 800.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

IV. Conclusion

The foregoing detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system comprising:
memory; and
a processing system coupled to the memory, the processing system configured to:
render a textual communication to provide a rendered textual communication, which replicates a visual representation of the textual communication that is visually observable by an end user;
extract text from rendered content of the rendered textual communication using an optical character recognition technique;
remove customization from the text to provide a templatized version of the rendered textual communication that comprises de-customized text;
parse the de-customized text, which is defined by a plurality of characters, into a plurality of tokens that comprise respective subsets of the plurality of characters;
convert the plurality of tokens into respective numbers;
process the numbers, which represent respective tokens of the plurality of tokens, using a same plurality of fuzzy hash functions to generate respective pluralities of hash values associated with the respective tokens;
select representative hash values that are generated using respective fuzzy hash functions, which are included in the same plurality of fuzzy hash functions that are used to process each of the numbers that represent the respective tokens of the plurality of tokens, by selecting, for each respective fuzzy hash function, a representative hash value from hash values that are associated with the respective tokens and that are generated using the respective fuzzy hash function; and
generate a content signature of the textual communication by bitwise concatenating at least portions of the respective representative hash values that are generated using the respective fuzzy hash functions, which are used to process each of the numbers that represent the respective tokens of the plurality of tokens.

2. The system of claim 1, wherein the processing system is configured to:
capture a snapshot of at least a portion of the rendered textual communication;
detect a region of interest in the snapshot based at least on a spatial location of a header of the rendered textual communication; and
extract the text from the region of interest.

3. The system of claim 1, wherein the processing system is configured to:
remove styling from the rendered content of the rendered textual communication to provide the text.

4. The system of claim 1, wherein the processing system is configured to:

parse the de-customized text by applying a rolling window to the plurality of characters to define the plurality of tokens such that successive tokens of the plurality of tokens begin at next successive characters of the plurality of characters.

5. The system of claim 1, wherein the processing system is configured to convert the plurality of tokens into the respective numbers by performing the following operations:

convert the plurality of characters into a plurality of respective binary representations;

generate concatenated binary representations for the respective tokens by bitwise concatenating the binary representations of characters in a respective subset of the plurality of characters into a concatenated binary representation for the respective token; and convert the concatenated binary representations for respective tokens of the plurality of tokens into respective integers that represent the respective tokens; and wherein the processing system is configured to process the numbers by performing the following operation:

process the respective integers, which represent respective tokens of the plurality of tokens, using the same plurality of fuzzy hash functions to provide the respective pluralities of hash values associated with the respective tokens.

6. The system of claim 1, wherein the processing system is configured to:

select a representative hash value from the hash values that are associated with the respective tokens and that are processed using a respective fuzzy hash function based at least on the representative hash value being no greater than other hash values that are processed using the respective fuzzy hash function.

7. The system of claim 1, wherein the processing system is configured to:

select a representative hash value from the hash values that are associated with the respective tokens and that are processed using a respective fuzzy hash function based at least on the representative hash value being no less than other hash values that are processed using the respective fuzzy hash function.

8. The system of claim 1, wherein the processing system is configured to:

generate the content signature of the textual communication by bitwise concatenating the portions of the plurality of respective representative hash values for the respective fuzzy hash functions;

wherein the portions are defined by the last N bits of the plurality of respective representative hash values; and wherein N is a predefined number that is less than or equal to four.

9. The system of claim 1, wherein the processing system is further configured to:

parse the content signature of the textual communication into a plurality of segments; and convert the plurality of segments into a plurality of respective hexadecimal numbers that represent the plurality of respective segments to provide an abbreviated content signature of the textual communication.

10. The system of claim 1, wherein the processing system is further configured to:

determine that a similarity between the content signature of the textual communication and a reference content signature of a malicious textual communication satisfies a similarity criterion; and block delivery of the textual communication to an intended recipient of the textual communication based at least on the similarity between the content signature of the textual communication and the reference content signature of the malicious textual communication satisfying the similarity criterion.

11. The system of claim 1, wherein the processing system is further configured to:

determine that a similarity between the content signature of the textual communication, which is received from a first entity, and a reference content signature of a malicious textual communication, which is received from a second entity that is different from the first entity, satisfies a similarity criterion; and determine that the textual communication and the malicious textual communication are generated from a common template based at least on the similarity between the content signature of the textual communication and the reference content signature of the malicious textual communication satisfying the similarity criterion.

12. The system of claim 1, wherein the processing system is further configured to:

determine that a similarity between the content signature of the textual communication and a reference content signature of a malicious textual communication satisfies a similarity criterion;

determine that the textual communication and the malicious textual communication are generated from a common template based at least on the similarity between the content signature of the textual communication and the reference content signature of the malicious textual communication satisfying the similarity criterion;

determine a difference between the content signature of the textual communication and the reference content signature of the malicious textual communication; and identify a change in content of the common template based at least on the difference between the content signature of the textual communication and the reference content signature of the malicious textual communication.

13. A method implemented by a computing system, the method comprising:

rendering a textual communication to provide a rendered textual communication, which replicates a visual representation of the textual communication that is visually observable by an end user;

extracting text from rendered content of the rendered textual communication using an optical character recognition technique;

removing customization from the text to provide a templatized version of the rendered textual communication that comprises de-customized text;

parsing the de-customized text, which is defined by a plurality of characters, into a plurality of tokens that comprise respective subsets of the plurality of characters;

converting the plurality of tokens into respective numbers;

processing the numbers, which represent respective tokens of the plurality of tokens, using a same plurality of fuzzy hash functions to generate respective pluralities of hash values associated with the respective tokens;

selecting representative hash values that are generated using respective fuzzy hash functions, which are included in the same plurality of fuzzy hash functions that are used to process each of the numbers that represent the respective tokens of the plurality of tokens, by selecting, for each respective fuzzy hash function, a representative hash value from hash values that are associated with the respective tokens and that are generated using the respective fuzzy hash function; and generating a content signature of the textual communication by bitwise concatenating at least portions of the respective representative hash values that are generated using the respective fuzzy hash functions, which are used to process each of the numbers that represent the respective tokens of the plurality of tokens.

14. The method of claim 13, further comprising:
capturing a snapshot of at least a portion of the rendered textual communication; and
detecting a region of interest in the snapshot based at least on a spatial location of a header of the rendered textual communication;
wherein extracting the text comprises:
extracting the text from the region of interest.

15. The method of claim 13, wherein extracting the text from the rendered content of the rendered textual communication comprises:
removing styling from the rendered content to provide the text.

16. The method of claim 13, wherein parsing the de-customized text comprises:
applying a rolling window to the plurality of characters to define the plurality of tokens such that successive tokens of the plurality of tokens begin at next successive characters of the plurality of characters.

17. The method of claim 13, wherein converting the plurality of tokens into the respective numbers comprises:
converting the plurality of characters into a plurality of respective binary representations;
generating concatenated binary representations for the respective tokens by bitwise concatenating the binary representations of characters in a respective subset of the plurality of characters into a concatenated binary representation for the respective token; and
converting the concatenated binary representations for respective tokens of the plurality of tokens into respective integers that represent the respective tokens; and
wherein processing the numbers comprises:
processing the respective integers, which represent respective tokens of the plurality of tokens, using the plurality of fuzzy hash functions to provide the respective pluralities of hash values associated with the respective tokens.

18. The method of claim 13, further comprising:
determining that a similarity between the content signature of the textual communication, which is received from a first entity, and a reference content signature of a malicious textual communication, which is received from a second entity that is different from the first entity, satisfies a similarity criterion; and
determining that the textual communication and the malicious textual communication are generated from a common template based at least on the similarity between the content signature of the textual communication and the reference content signature of the malicious textual communication satisfying the similarity criterion.

19. The method of claim 13, further comprising:
determining that a similarity between the content signature of the textual communication and a reference content signature of a malicious textual communication satisfies a similarity criterion;
determining that the textual communication and the malicious textual communication are generated from a common template based at least on the similarity between the content signature of the textual communication and the reference content signature of the malicious textual communication satisfying the similarity criterion;
determining a difference between the content signature of the textual communication and the reference content signature of the malicious textual communication; and
identifying a change in content of the common template based at least on the difference between the content signature of the textual communication and the reference content signature of the malicious textual communication.

20. A computer program product comprising a computer-readable storage medium having instructions recorded thereon for enabling a processor-based system to perform operations, the operations comprising:
rendering a textual communication to provide a rendered textual communication, which replicates a visual representation of the textual communication that is visually observable by an end user;
extracting text from rendered content of the rendered textual communication using an optical character recognition technique;
removing customization from the text to provide a templatized version of the rendered textual communication that comprises de-customized text;
parsing the de-customized text, which is defined by a plurality of characters, into a plurality of tokens that comprise respective subsets of the plurality of characters;
converting the plurality of tokens into respective numbers;
processing the numbers, which represent respective tokens of the plurality of tokens, using a same plurality of fuzzy hash functions to generate respective pluralities of hash values associated with the respective tokens;
selecting representative hash values that are generated using respective fuzzy hash functions, which are included in the same plurality of fuzzy hash functions that are used to process each of the numbers that represent the respective tokens of the plurality of tokens, by selecting, for a respective fuzzy hash function, a representative hash value from hash values that are associated with the respective tokens and that are generated using the respective fuzzy hash function; and
generating a content signature of the textual communication by bitwise concatenating at least portions of the respective representative hash values that are generated using the respective fuzzy hash functions, which are used to process each of the numbers that represent the respective tokens of the plurality of tokens.

* * * * *